(12) United States Patent
Murgatroyd

(10) Patent No.: US 6,578,747 B2
(45) Date of Patent: *Jun. 17, 2003

(54) TOOL FOR ANGLED CLEAVING OF OPTICAL FIBERS OR THE LIKE

(75) Inventor: Ian John Murgatroyd, Coventry (GB)

(73) Assignee: Oxford Fiber Limited, Birmingham (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,756
(22) PCT Filed: Jun. 1, 1998
(86) PCT No.: PCT/GB98/01598
§ 371 (c)(1), (2), (4) Date: Nov. 29, 1999
(87) PCT Pub. No.: WO98/54608
PCT Pub. Date: Dec. 3, 1998

(65) Prior Publication Data
US 2002/0084301 A1 Jul. 4, 2002

(30) Foreign Application Priority Data
May 30, 1997 (GB) .............................. 9711133

(51) Int. Cl.⁷ ................................ B26F 3/00
(52) U.S. Cl. ...................... 225/96.5; 225/104; 225/105
(58) Field of Search ................ 225/96, 96.5, 101, 225/103, 102, 104, 105

(56) References Cited

U.S. PATENT DOCUMENTS

| | | | | |
|---|---|---|---|---|
| 3,819,096 A | * | 6/1974 | Pyper ........................ 225/96.5 |
| 4,216,004 A | * | 8/1980 | Brehm et al. .................. 65/2 |
| 4,322,025 A | * | 3/1982 | Johnson ..................... 225/96.5 |
| 4,502,620 A | * | 3/1985 | Leiby ............................ 225/2 |
| 4,552,290 A | * | 11/1985 | Szostak ......................... 225/2 |
| 4,896,649 A | * | 1/1990 | Radenecker ............... 225/96.5 |
| 5,129,567 A | * | 7/1992 | Suda et al. ................ 225/96.5 |
| 5,188,268 A | * | 2/1993 | Hakoun et al. ............ 225/96.5 |
| 5,213,244 A | * | 5/1993 | Curtis et al. ................... 225/2 |
| 5,368,211 A | * | 11/1994 | Michel et al. ............. 225/96.5 |
| 5,382,276 A | * | 1/1995 | Hakoun et al. ............... 65/433 |
| 5,839,635 A | * | 11/1998 | Mansfield et al. ......... 225/96.5 |

* cited by examiner

Primary Examiner—M. Rachuba
Assistant Examiner—Kim Ngoc Tran
(74) Attorney, Agent, or Firm—Mitchell Silberberg & Knupp LLP

(57) ABSTRACT

An improved device or tool is provided for cleaving angled ends on to at least one optical fiber (1) (FIG. 1) in which spring means (6) and co-operating pivotally mounted clamping blocks (7a, 7b) are employed to clamp and tension the optical fiber (1) with tension (T). A sharp corner edge (11) of an anvil (10) is used to locally deflect or displace the fiber (1) and bend it about the opposing sharp corner edge (12) of the clamping surface (5) of one of the clamping blocks (viz 7b) so that the fiber experiences a localized shear force. The resultant stress is a superposition of tension and shear and is directed away from the axis of the fiber (1). An acutely angled blade (13) is operable to score the fiber (1) at a point between the two opposing corners (11, 12). The fiber (1) cleaves with ends which are consistently angled at between 1° and 20° (preferably 5° to 10°) away from the perpendicular to the fiber axis. This end angle obtained depends upon the distance between the opposing corners (11, 12) and the deflection of the fiber (1) and the anvil (10) and the tension of the fiber (1), and is adjustable. The tool is capable of cleaving multiple arrangements of fibers in one operation such as fibers arranged in ribbon form. Other objects of glass or other brittle material similar to optical fibers can be cleaved by the tool. Several variations of the tool are described.

6 Claims, 9 Drawing Sheets

TOOL FOR ANGLED CLEAVING OF OPTICAL FIBERS OR THE LIKE

BACKGROUND OF THE INVENTION

The relative widespread and ever increasing use of optical fiber materials as means for carrying optical signals for telecommunications has created a need for devices or tools to cleave the glass of the optical fiber. The cleaved end of the optical fiber should be largely smooth and free from surface imperfections.

When the glass fiber is terminated, light beams travelling into or out of the optical fiber will have a portion of their light reflected from the end face of the fiber. If this reflected light is directed back towards the source of the light beam it will have deleterious effects, including an increase in the optical noise level and possibly disturb the operation of the light source such as a semiconductor laser.

However, if the cleaved end of the fiber is not perpendicular, the reflected light will be directed in a direction away from the incident light beam path and will not affect the light source. Similarly, if light travelling in an optical fiber exits an angled cleaved end of the fiber, for instance in a mechanical splice, then any light reflected from the cleaved end will be directed away from the optical axis of the glass fiber, hence the reflected light will not be guided by, and will not propagate back down, the optical fiber. Consequently, no back-reflection will be observed due to the cleaved end. A cleaved end angled at approximately 6°–8° away from the perpendicular will reduce the back reflection of light in an optical fiber to less than −60 dB.

Applications for angled cleaved ends designed to eliminate back-reflections are found in the pigtailing of optical devices such as semiconductor lasers and in the manufacture of optical coupled fiber Bragg gratings, mechanical splices etc. Suppression of end reflections could also find applications in the design of solid-state laser cavities such as Nd:YAG and in the manufacture of Selfoc lenses. Applicants prior abandoned International Patent Application No PCT/GB96/00919 (published under No WO96/33430) discloses details for the design of a tool for cleaving perpendicular ends onto glass fiber. Other, different, cleaving tools also exist. However, only a few cleaving tools exist which deliberately and controllably cleave angled ends onto optical fiber, including those from York Technology UK and Mars-Actel France. However, these tools require several steps for their operation and hence are difficult to use for an unskilled operator. Both tools tension and twist the fiber before cleaving the fiber with an angled end in the range of 5°–10°. The torsion present in the fiber gives angled cleaved ends but with the presence of surface roughness or hackle which becomes more severe with increased fiber end angle. Furthermore, these tools are only capable of angled cleaving a single optical fiber whereas optical fibers are often arranged in the form of a ribbon containing up to 16 fibers.

A further prior art angled cleaving tool is disclosed in U.S. Pat. No. 5,312,468 (Yin et al) in which deflection or bending of the optical fiber or of parallel fibers is effected by displacement of one of a pair of spaced apart fiber clamping means relative to the other in a direction is perpendicular to the axis of the or each fiber. A blade operable between the pair of clamping means effects scoring of the fiber or fibers to initiate angled cleaving at the deflection or bending. An anvil or the like is not employed whilst traction tensioning, or torsion, of the or each fiber is specifically excluded.

In another form of angled cleaving tool disclosed in prior U.S. Pat. No. 5,123,581 (Curtis et al) the fiber is held and tensioned by a pair of spaced apart clamping means and an anvil having an abrupt edge is operable to bear upon the fiber to cause some deflection or bending of it.

An opposing scoring disc or blade slightly offset from the anvil is operable against the fiber to score it and so initiate its angled cleaving. Effective deflection or bending of the fiber takes place between the anvil and blade during scoring so that the clamping means merely perform a fiber clamping and tensioning function.

SUMMARY OF THE INVENTION

It is a principal object and purpose of this invention to provide an improved tool capable of compact and simplified construction for cleaving angled ends onto single or multiple optical fibers which can reliably effectuate satisfactory optically flat end faces. These can be in the region of the fiber core or cores with end angles β in the range of 1°–20° and preferably in the ranges 5°–10° away from the perpendicular to the fiber axis, in order to reduce the back reflection from the cleaved glass surface or surfaces. The cleaved surfaces should be mirror-smooth and largely free from defects in the region of the core of the optical fiber.

It is also desirable to provide an arrangement for cleaving optical fibers at specified and precise distances from the end of the fiber coating or from a constraining device such as a ferrule or connector.

According to this invention a tool for angled cleaving of at least one optical fiber or the like in which a pair of spaced apart clamping means is provided for holding and traction tensioning a length of a said optical fiber or of each such fiber of parallel fibers therebetween, together with anvil means for effecting localised deflection or bending of the length of optical fiber and also blade means for scoring the length of optical fiber in a required sequence of operation of the tool in order to initiate and cause angled cleaving of the length of optical fiber; the tool being characterised by the anvil means having a sharp corner edge for transverse contact with the fiber, which corner edge is closely offset laterally from a corresponding transverse sharp corner edge of a clamp member of one of the clamping means or of a separate part adjacent to said clamp member, said anvil means being operable for controlled close shear force action movement of its corner edge relative to the corner edge of the clamp member or part which latter is or are substantially fixed in the tool apart from slight fiber tensioning movement of the clamp member, whereby localised deflection or bending of the fiber is effected between the respective sharp corner edges in obtaining angled cleaving of the fiber as a result of its scoring by the blade means which is arranged to act against the fiber between said transverse sharp corner edges.

BRIEF DESCRIPTION OF THE DRAWINGS

Various embodiments and examples of the invention will now be described with reference to the accompanying enlarged scale diagrammatic drawings in which:

FIG. 4b shows an end face view of the cleaved end shown in FIG. 4a;

DESCRIPTION OF THE PREFERRED EMBODIMENTS

Figure 1:
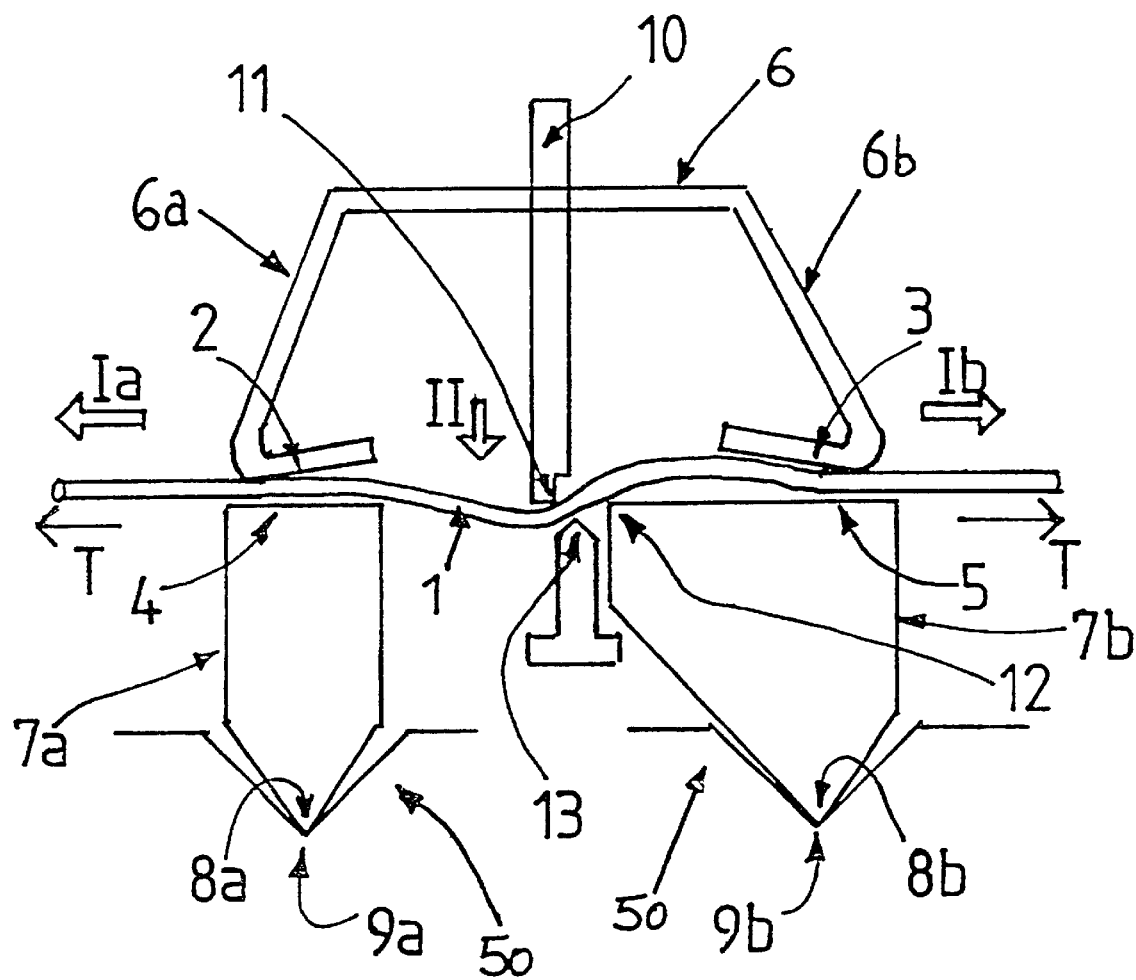
FIG. 1 shows an optical fiber clamped between two upper clamping surfaces and two lower surfaces, with the presence of an anvil deflecting the fiber and an edge scoring the tensioned fiber.

Like parts are referred to by the same, or similar reference numerals throughout the drawings whilst any dimensions or other values quoted herein are given by way of example only and may be varied accordingly to practical requirements.

This invention reveals the details of the design of a tool for controllably cleaving single or multiple optical fibers with cleaved end angles β in the range 1°–20° and preferably in the range 5°–10° away from the perpendicular to the axis of the fiber.

In particular the aforesaid prior International Patent Application describes details of a tool for perpendicular cleaving of optical fiber, comprising a pair of spaced apart clamps operable for holding the fiber in a tensioned condition for scoring by a blade whereby subsequent cleaving of the fiber is effected by the tension thereon, whereby spaced apart clamps for holding the fiber are operable on clamping pressure both to clamp and tension the fiber, incorporating also a two-armed anvil which displaces the fiber in addition to the applied tension. At a point in between the arms of the anvil, the tensioned and bent fiber is scored by a blade edge which is moved at an acute angle to the fiber, so causing the fiber to cleave. The tension present in the fiber is aligned along its axis, and because the cleave propagates perpendicular to the internal stress, the resultant cleaved end face is perpendicular to the axis of the optical fiber.

The prior International Patent Application also reveals details of the angled cleaving of a fiber or fibers using a secondary anvil. The clamped and tensioned fiber was displaced by a one-armed primary anvil and was also displaced in the opposite direction by a secondary anvil. Because the tensioned fiber was displaced in opposite directions, it experienced a shearing action at points between the two anvils. The resultant stress in the fiber was a superposition of tension and shear. Consequently, when the fiber was scored at a point between the two opposed anvils, the cleave propagated perpendicular to the resultant applied stress, i.e. at an angle away from the perpendicular to the axis of the fiber, creating an angled cleaved end. This technique was achievable for both single and multiple fibers.

In this invention, improvements to this technique of angled cleaving are revealed, whereby the secondary anvil is incorporated into one of the clamping surfaces, so simplifying the mechanism, yet still achieving the goal of angled cleaving single and multiple optical fibers.

FIG. 1 shows an arrangement of a pair of the clamps 6a, 7a; 6b, 7b which both clamp and tension at lease one optical fiber. The optical fiber 1 is stripped and placed between the two polished upper clamping surfaces 2, 3 and the two polished lower clamping surfaces 4, 5. The upper two clamping surfaces 2, 3 are part of a common spring member 6. Downward pressure on the spring member 6 will provide a force with a downward component, so clamping the optical fiber 1 at two positions between surfaces 2 and 4 and 3 and 5. In addition, due to the angle of the clamping legs 6a, 6b of the spring 6, the same downward force has components which are resolved in the directions Ia, Ib parallel to the fiber 1, which act to tension it with a force T. The bottom clamping surfaces 4, 5 are the surfaces of clamp blocks or jaws 7a, 7b which are pivoted around sharp edges 8a, 8b at their lower ends as they rest in corresponding grooves 9a, 9b in a base part 50 of support structure of the tool and which allows them to pivot in a direction along the axis of the optical fiber. Downward pressure therefore both clamps the fiber 1 at two points and urges the two clamping surfaces 2, 4 away from the other two clamping surfaces 3, 5 in directions Ia, Ib, so tensioning the fiber.

In a known manner support structure or a body of the tool including the base part 50 carries lever or like means (not shown) for imparting downward pressure on the spring 6 and operation of associated movable parts of the tool. This generally applies to further forms of the tool as later described.

Figure 2A:
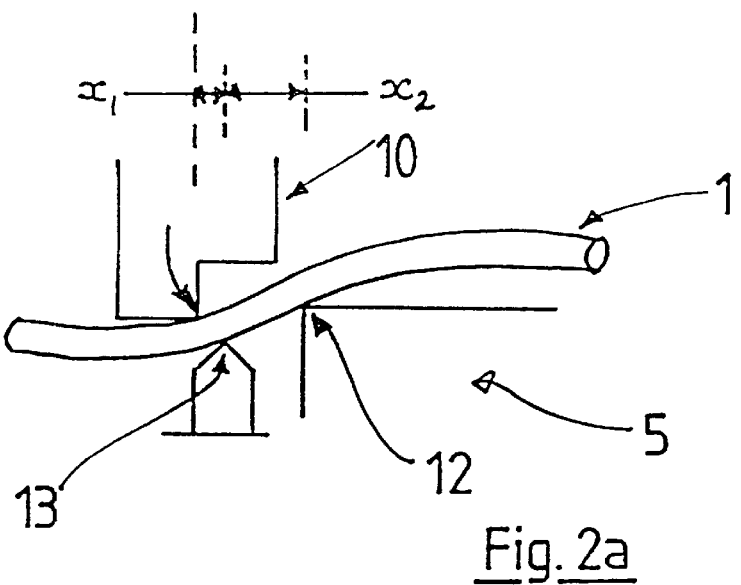
FIG. 2a shows an enlarged view of the tensioned optical fiber, sheared between the corners of the anvil and a lower clamping surface and being scored by the edge of a sharp blade.

Further operation of the tool causes a shear action anvil 10 to descend such that its sharp corner 11 comes into contact with the clamped and tensioned fiber 1. The anvil 10 displaces the fiber 1 in the direction II in FIG. 1 until a stop (not shown) is reached such that the fiber is bent by the anvil by a preset amount. In addition, one of the two lower clamping blocks viz the block 7b has a sharp shear action corner 12 which is located close to but laterally displaced from the anvil 10, as shown in FIGS. 1 and 2a. The displacement of the fiber 1 by the motion of the anvil 10 causes the fiber 1 to be bent at two locations, namely the sharp corner 11 of the anvil 10 and the sharp corner 12 of the lower clamping block 7b. In the region between the corner 11 of the anvil and the corner 12 of the lower block 7b, the fiber 1 is therefore both tensioned due to the spreading apart of the clamps in directions Ia, Ib and sheared because it is bent between two opposing sharp corners 11, 12. Consequently, the fiber experiences a resultant stress which is not parallel to the axis of the fiber.

Figure 3:
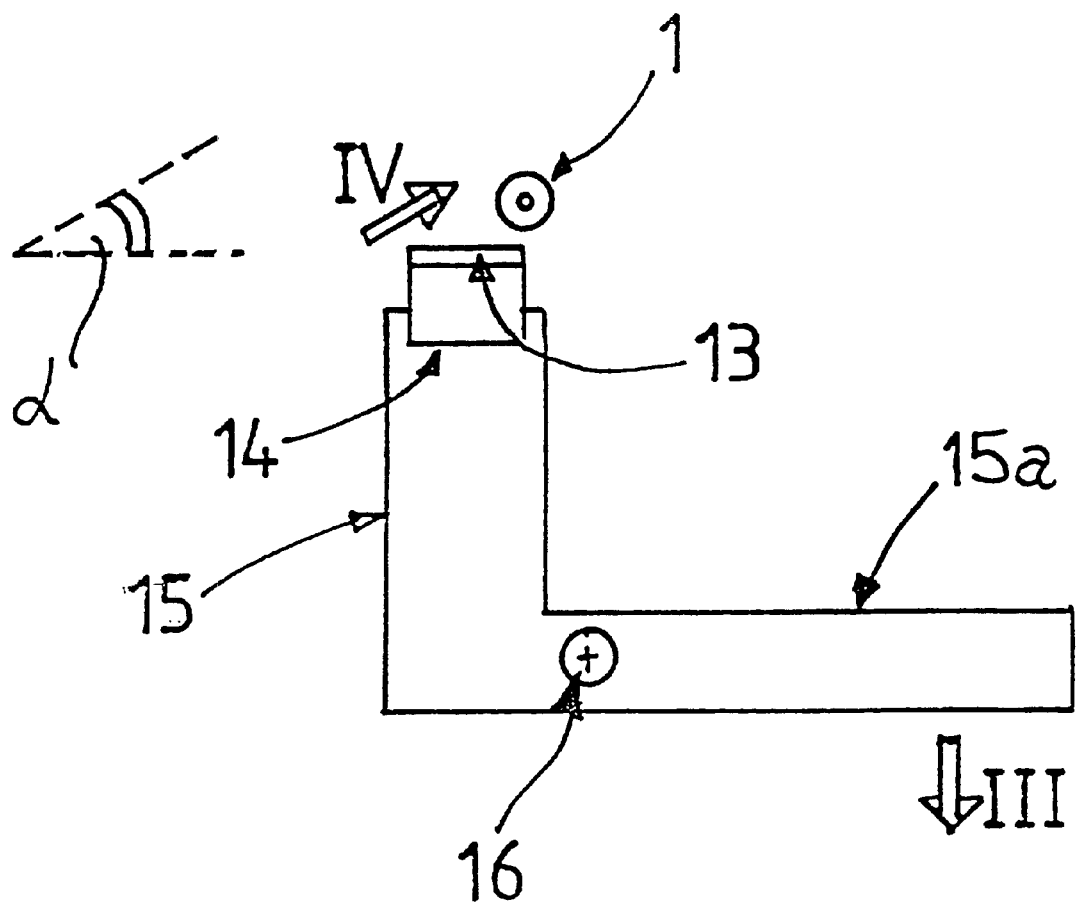
FIG. 3 schematically shows an angled blade scoring an optical fiber where the blade's motion is at an acute angle α a to its edge due to rotation around a pivot.

Yet further operation of the tool moves a scoring blade edge 13 to contact the stressed fiber and so score it. The blade 14 with its edge 13 is mounted on an arm 15 which moves about a pivot 16, as shown in FIG. 3. Movement of the end 15a of the arm 15 in the direction IIIA causes the blade edge 13 to move in the direction of arrow IIIB at an acute angle α, with respect to its edge 13, so scoring the fiber at the acute angle α, and causing the latter to cleave due to the tension therein. Consequently, when the blade edge 13 scores the fiber 1 in the region between the two corners 11, 12 where the internal stress is aligned in a direction away from the axis of the fiber, the fiber cleaves perpendicular to the internal stress in the fiber, and so the resultant cleaved end is angled away from the perpendicular to the fiber axis. The acute angling of the blade edge 13 minimises the forces of the edge 13 scoring the fiber 1 and hence introduces the minimum extra stress into the fiber as its cleaves, ensuring that the resultant stress at the time of cleaving is well controlled.

Figure 2B:
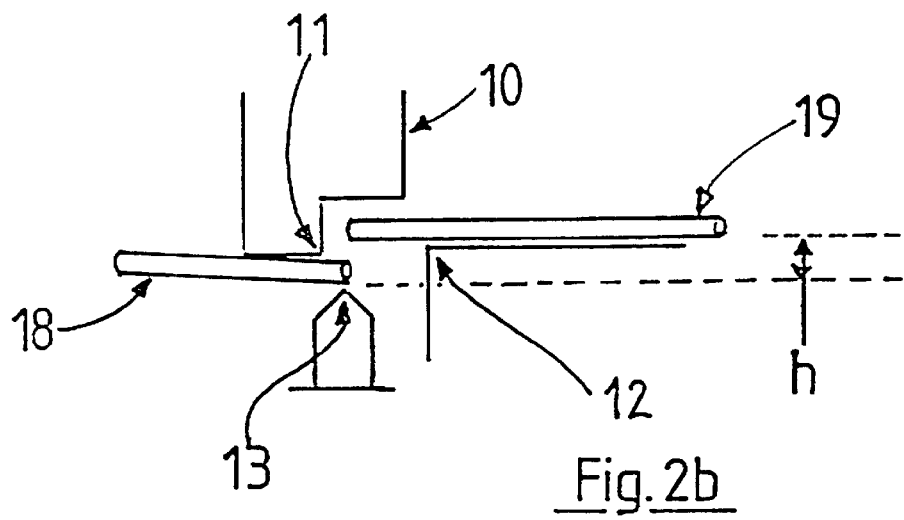
FIG. 2b shows the fiber after cleaving.
Figure 2C:
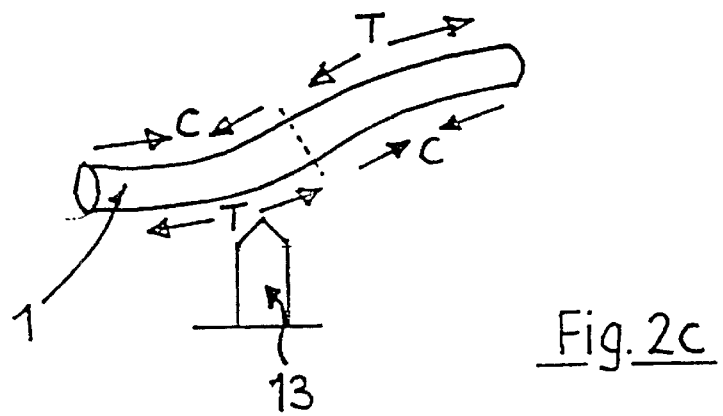
FIG. 2c shows skin tension and compression of a bent fiber.

As shown in FIG. 2c the blade edge 13 scores the displaced fiber at a location where the fiber skin is under tension. Skin tension T and compression C is also indicated in FIG. 2c.

The cleaved end should be smooth and defect-free. The tension T applied by the action of the clamps is necessary to propagate the cleave. However, too much tension will cause the cleave to propagate too fast, creating hackle on the cleaved end. If too little tension is used, the scoring edge 13 will be required to penetrate too deeply into the fiber to initiate the cleave, giving a poor cleave. An applied tension of approximately 200 grams gives good cleaves.

Preferably, the fiber or fibers should be scored at a point or points close to the position of the corner 11 of the anvil 10 so that the blade bites into the outside of the curve of the displaced fiber such that $x_1 < x_2$ in FIG. 2a. Scoring at a point further away from the action of the anvil, i.e. closer to the corner 12 of the clamping surface, may create substantial blade damage because the anvil is less able to resist the cutting action of the blade and the fiber may be placed under compression at the point of scoring.

Furthermore, the displacement of the fiber by the anvil must be great enough to resist the cutting force of the blade, so requiring only a small score to initiate the cleave, but not so great as to overbend the glass fiber, which would lead to significant lips or roll off of the cleaved end. FIG. 2b shows the anvil 10 displacing the fiber 1 such that there is a vertical displacement between the end portions 18, 19 after cleaving. A displacement h of approximately 150 μm and a distance $x_1+x_2$, of approximately 0.8 mm will lead to a cleaved end with an angle β of approximately 6°–8° from the perpendicular in the region of the core 17 of a single mode fiber.

Figure 4A:
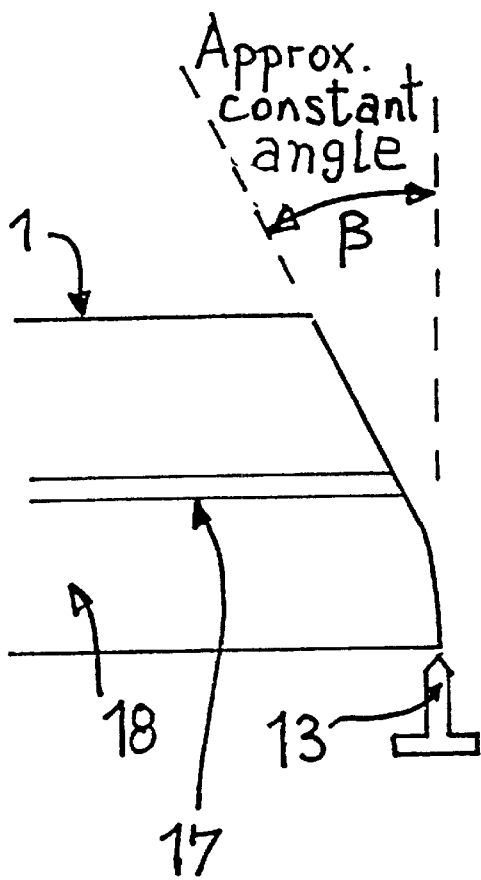
FIG. 4a shows a side view of a cleaved fiber end showing the cleaved end angle β approximately constant across three-quarters of the fiber including the core (the angle β is exaggerated for clarity in the drawing)
Figure 4B:
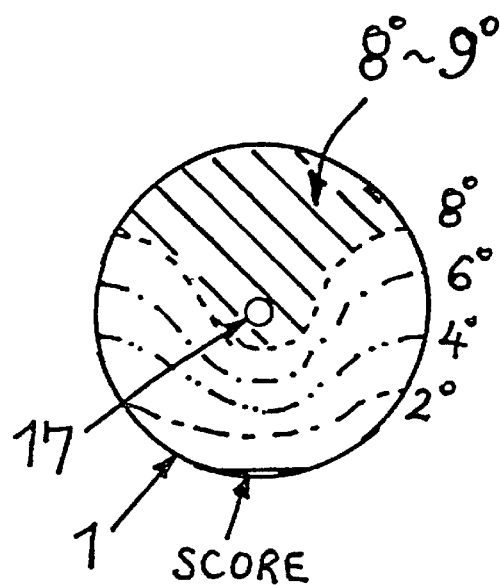

The angle of the cleaved end is approximately constant over most of its diameter, including the region of the single mode core 17 as required to reduce the back-reflection as shown in FIG. 4a where the angle β from the perpendicular is exaggerated. However, the region of the glass within approximately one-quarter of a fiber diameter from the point of scoring by the blade has a lower end angle β than the remainder of the cleaved end face. Furthermore, the two cleaved parts of the fiber are not identical. The cleaved end of the end portion 18 to the left of the blade edge 13 in FIG. 2b, and as shown in FIG. 4a, is smooth without any lips; this end portion 18 should be used as the cleaved fiber end for pigtailing optical components, etc. In contrast, the matching angled cleaved end of the portion 19 to the right of the blade in FIG. 2b protrudes from the fiber end and is therefore likely to be damaged and should be discarded as the offcut. FIG. 4b is an end face view of the angle cleaved end shown in FIG. 4a where contour lines plot equi angle surfaces.

To determine the angle of the cleaved ends, 125 μm diameter optical fiber was stripped, cleaned and placed in the tool and cleaved. The cleaved ends were mounted on a block under an optical microscope using monochromatic light incorporating an interference lens such that interference fringes were observed on the cleaved surfaces. The block was angled at 8.0° and the cleaved fiber was rotated so that its angled end was approximately horizontal such that interference fringes could be seen. When the interference fringes were widely spaced in the region of the fiber core, the cleaved surface was approximately horizontal and the cleaved end angle β in the region of the core of the fiber was equal to the angle at which the mounting block was tilted. When the interference fringes were closely spaced, the end angle β differed from the angle of the block. The angle of the block could be changed to alter the angle at which the fiber was mounted to minimise the number of interference fringes. In this way the end angle β of the core of the fiber can be measured to an accuracy of approximately 0.3°.

30 test cleaves were taken. Their end angle β was measured, with an average end angle of 5.8° and a standard deviation of 0.3°. The cleaved ends were mirror smooth with no significant hackle and the score mark intruded less than 5 μm into the fiber. The tension T arising from clamping the fiber was approximately the same as used in the perpendicular cleaving device, as described in the aforesaid International Patent Application, i.e. approximately 200 grams. The outsides of the clamping surfaces were approximately 15 mm apart. The distance between the corner 11 of the anvil 10 and the corner 12 of the bottom clamping block 7b was approximately 1.0 mm; the blade scored the fiber at a distance $x_1$ of approximately 0.2 mm from the corner 11 of the anvil. The anvil displaced the fiber such that the vertical distance h between the two fiber ends after cutting was approximately 150 μm.

The tool was then modified to cleave 200 μm diameter optical fiber. The tension used was adjusted to approximately twice the tension used above, i.e. approximately 400 grams. $x_1+x_2$ was approximately 1.0 mm and h was approximately 150 μm. 30 cleaves were taken. An average cleave angle of 8.0° from the perpendicular was obtained with a standard deviation of only 0.6°. The cleaved ends were mirror smooth with no significant hackle and a small score mark less than 10 μm deep.

It can be seen from these test results that the tool is effective in consistently cleaving optical fiber with the cleaved end angle β approximately 5°–10° from the perpendicular with a low standard deviation in the end angle achieved.

The tool can also be modified to angle cleave optical fiber of other diameter to those referred to in the above mentioned tests. It is believed that the tool can angle cleave 80 μm diameter fiber and smaller and fiber in excess of 200 μm diameter and also of any other diameters of this order. The tool can also angle cleave fiber of non-circular cross section.

The cleaving tool according to this invention is superior to tools which achieve angled ends by twisting the fiber, such as the York Technology or Mars-Actel cleavers. The variation in the end angle achieved by the present tool is very small because the shear stress is precisely defined by the distances $x_1 x_2$ over which the fiber is bent. In contrast, prior art tools which twist the fiber to achieve an angled end have an inherently larger variation in end angle because the length over which the fiber is twisted is not well defined because of variation in the position where the fiber is clamped. Furthermore, shearing the fiber between two corners 11, 12 in this invention does not lead to hackle which becomes serious for ends with angles greater than 5°–8° using a twisting method. Consequently, as a result of this invention angled ends can be cleaved with greater end angles that prior art tools. End angles β of up to 20° from the perpendicular have been achieved with this tool. In particular, the cleaving tool can cleave 125 μm diameter multi-mode fiber so that the end angle β across the majority of the 50 μm or 62.5 μm core 17 is greater than 10°, so reducing the back-reflection to approximately −60 dB. This is best achieved when $x_1$ is approximately equal to $x_2$.

The end angle β achieved depends upon the combination of shear and tension forces and can be varied by altering either the deflection h of the fiber by the anvil or by changing the distance $x_1+x_2$ between the corner 11 of the anvil and the corner 12 of the lower clamping block 7b or altering the tension T. To increase the angle β of the cleaved end h can be increased, $x_1+x_2$ can be decreased or the tension T in the fiber generated by clamping can be decreased, and vice-versa to decrease the end angle β.

This invention envisages that the angle cleaved onto the end of the fiber can be varied by varying the distance h that the fiber is deflected by the anvil. A greater deflection h gives a greater end angle β. The amount of deflection and hence the end angle can be controlled by the operator or set in the factory by altering the stop which determines how far the anvil deflects the fiber.

Figure 5:
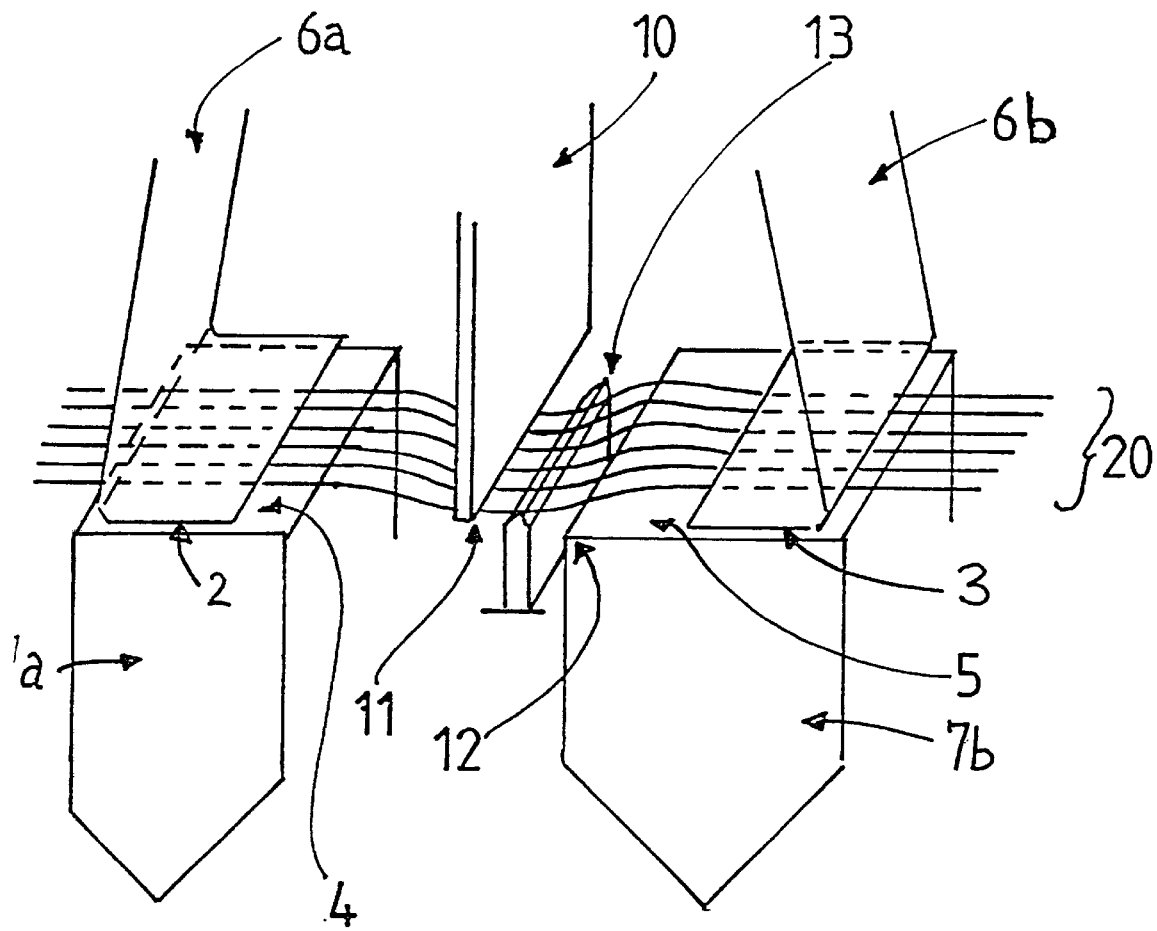
FIG. 5 shows a ribbon of fibers being angle cleaved after having been clamped, sheared and scored.

This cleaving tool can also cleave angles onto the ends of all fibers in a ribbon. A fiber ribbon 20 is stripped and placed in the tool, as shown in FIG. 5. Downward pressure on the clamp spring members 6a, 6b clamps the fibers and tensions them. All of the fibers are bent by the same amount by the corner 11 of the anvil, as shown in FIG. 5, and so experience the same shear stress between corners 11 and 12. Consequently, when the fibers are scored by the blade and so cleave, all of them cleave with the same end angle β.

Figure 7:
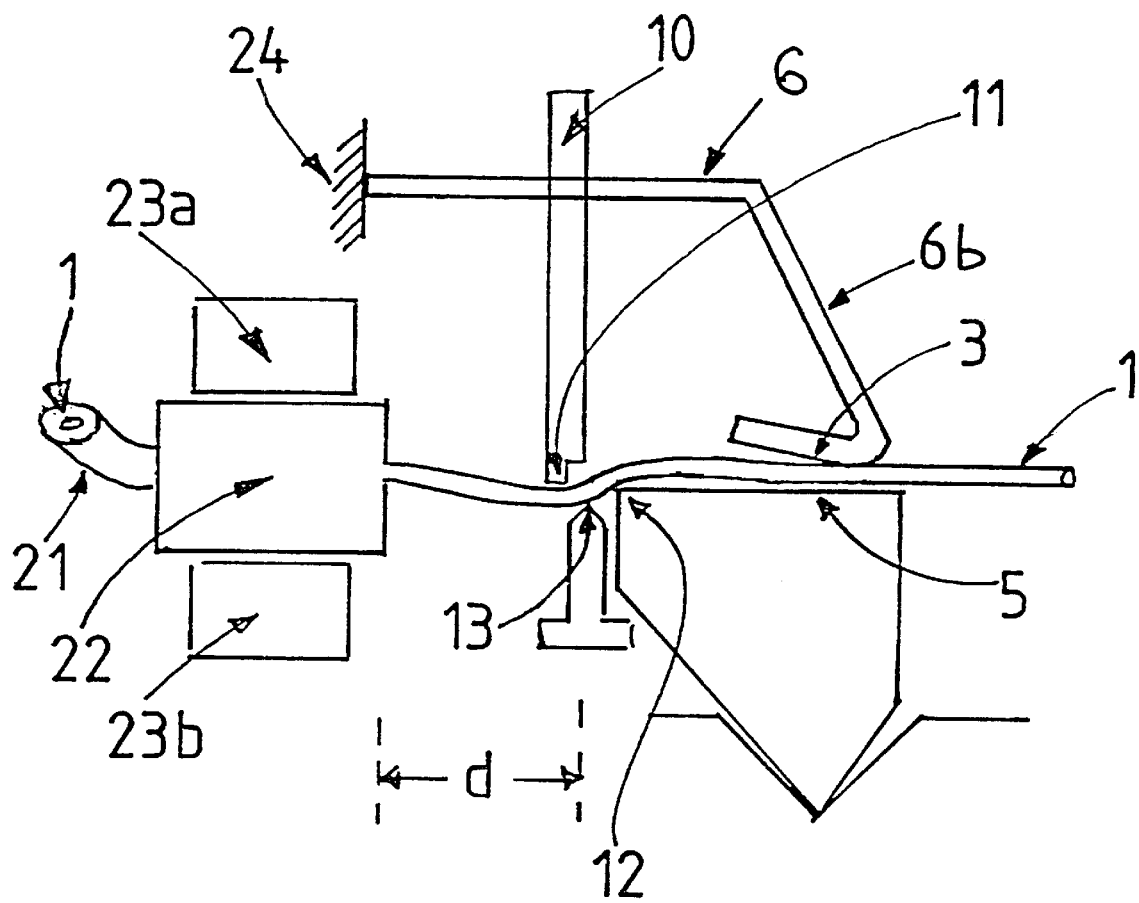
FIG. 7 shows the angled cleaving of a fiber held in a connector.

This cleaving tool can also be used to cleave optical fibers at specified and precise distances from the end of the coating or other constraining device such as a ferrule or connector 22 (FIG. 7). The stripped fiber should be mounted in the tool and located, for instance by means of a clamp or stop, such that the fiber coating or the ferrule is held at a precise distance from the scoring edge 13. Consequently, the angled cleaved end will be located at a predetermined distance from the end of the coating or the ferrule for later use with mechanical clips, such as used in mechanical splicing or in opto-electronic device packages such as laser diodes or detectors. See FIGS. 7 and 8 as later referred to.

Figure 6:
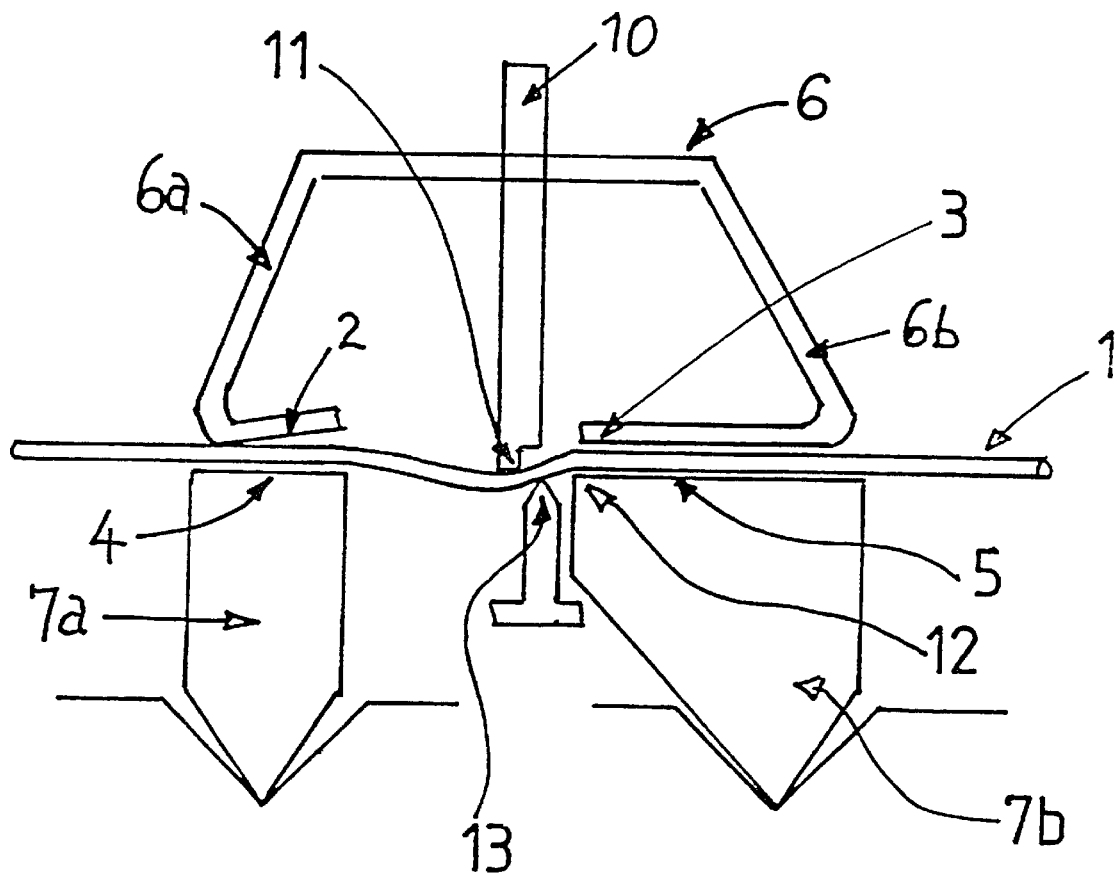
FIG. 6 shows a tensioned and cleaved fiber being angled cleaved where the fiber is firmly held upto the point of shearing.

In a development of the invention, the end angle β cleaved onto the end of the optical fiber card increased for given values of $x_1+x_2$, h and T by firmly holding the optical fiber in the region of the sharp corner 12, so that it does not lift up away from the clamping surface 5. This can be achieved by extending the upper clamping surface 3 as shown in FIG. 6. Deflection of the fiber by a given distance h by the sharp corner 11 of the anvil will create a greater shear force if the fiber is firmly held between the co-extensive surfaces 3 and 5 in the region of the point of bending over the sharp corner 12 of the lower clamping block 7b compared to the fiber not being firmly held as it is bent over the corner 12 as in FIG. 1. The greater cleaved end angle β is useful for reducing back-reflection for example in multi-mode optical fiber which requires an end angle in excess of 10° over the entire region of the core.

In a further development of the invention, the device can be used to cleave an angled end onto an optical fiber which is held in an optical connector or other holding device. FIG. 7 shows the optical fiber 1 with its coating 21 secured in a connector 22 which is firmly held into the cleaving tool by clamps 23a, 23b. One end of the spring 6 is connected to a firm support 24, while the other end 6b of the spring 6 acts to clamp and tension the optical fiber 1 which is protruding from the connector 22. As previously, the tensioned fiber or each fiber 1 is deflected by the sharp corner 11 of an anvil such that it is bent over the opposing sharp corner 12 of the lower clamping block 7b. The fiber 1 is scored in between the two opposing sharp corners 11, 12 in the region where they are sheared as well as being under tension. The resultant cleaved end will be angled at an angle β from the perpendicular, as is required to reduce the back-reflection. The cleaved ends will be at a predetermined distance d from the end of the connector 22 such that the connectorized fiber can be used in optical devices such as semiconductor lasers or mechanical splices. The tool can also be used simultaneously to cleave angled ends onto each fiber in a ribbon fiber connector such as an MT Connector or otherwise.

Figure 8:
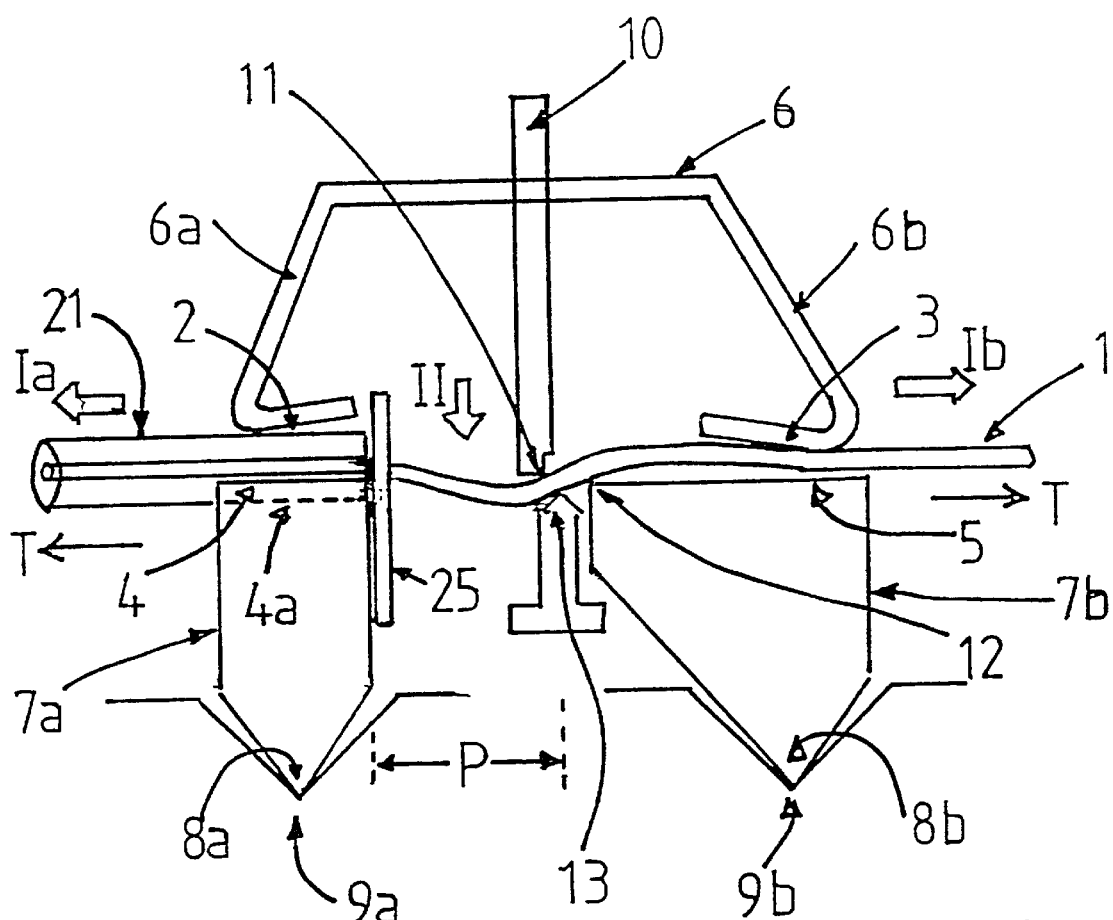
FIGS. 8 and 9 are general views similar to FIG. 1 but each showing a further development of the tool.

Still further developments of the invention are now described as follows:

Referring to FIG. 8 the tool can be used to angle cleave fiber 1 where the fiber is clamped by its coating 21 and the angled cleave is achieved at a set length from the end of the coating 21. A length of the fiber's coating is stripped and the fiber is placed in the modified tool, as shown in FIG. 8. The coating 21 of the fiber is placed in a groove 4a which is provided in the lower clamping surface 4 on the left-hand side of the tool, whereas the stripped portion of the fiber is placed on the polished clamping surface 5 on the right-hand side of the tool. Operating or closing the tool clamps coating 21 on the left-hand side and the stripped fiber 1 on the right-hand side of the tool. Further pressure urges apart the two clamping points, but because they cannot separate due to the clamped fiber, the force therefore tensions the fiber. The tensioned fiber is then deflected by the corner 11 of anvil 10, shearing the fiber and giving an angled cleave when the fiber is scored. Cleave lengths as short as 2 mm or less are possible, limited only by the need for the anvil to deflect the fiber. The coating can optionally be pushed against a stop 25 to give a fixed cleave length P from the end of the coating with an accuracy approaching +/−0.1 mm.

Clamping the fiber 1 by its coating 21 has an added advantage because the glass is not contacted by the steel clamping surfaces and therefore is not liable to damage, reducing the danger of surface cracks on the cleaved fiber. Preferably the fiber should be enclosed by its coating so that the tension is adequately transferred to the glass so that it can be cleaved, although some slippage of the fiber out of the coating may occur it will still transfer sufficient tension to the fiber. Angle cleaving depends upon a controlled deflection of the tensioned fiber. When the fiber is eccentric in its coating, the distance which the fiber is deflected by the anvil 10 may be changed, leading to a variation in the end angle. Referring back to FIGS. 2a and 2b this variation can be minimised by increasing the distance h, whilst maintaining the angle of the cleaved end by increasing $x_1$ and $x_2$. The larger value of h will minimise the effect of any fiber/coating eccentricity. A value of $x_1$ of 1 mm will allow a fiber /coating eccentricity as large as approximately 75 μm, whilst maintaining a standard deviation in the end angle of +/−1° for an 8° end angle.

Further in this regard and in yet another embodiment of this invention, the tool can be used to angle cleave fiber without stripping off the protective coating 21 of the fiber. The coated fiber is clamped at two positions. The coated fiber is subsequently tensioned and deflected by the anvil 10. The angled diamond blade edge 13 cuts through the coating and then scores the fiber and an angled cleave is propagated by the applied tension and shearing forces. Cleaving the fiber through its coating is particularly effective when the optical fiber 1 is very brittle, as is the case of Tellurite fiber or Fluoride fiber. The coating 21 cushions the clamping of the fiber 1, allowing the fiber to be tensioned without damaging it.

Referring back to FIGS. 2a, 4a and 4b, the angled cleave is not entirely flat over its whole surface. For a small value of $x_1$, the core 17 of a single mode fiber is approximately flat, angled at 8°. The half of the fiber end away from the score is approximately flat across its whole semicircle, angled at 8°. However, the angle of the half of the fiber end close to the score approaches the perpendicular close to the point of the diamond score. It has been found that increasing the ratio of $x_1$ to $x_2$ increases the area of the centre of the cleaved end face which is approximately flat. When $x_1$ is approximately equal to $x_2$, the end face upto a distance of 25 µm from the centre of the core (for a 125 µm diameter fiber) is approximately flat, angled at 8°, before the end angle begins to decrease moving towards the score. This allows the tool to be used for reducing the back-reflection of a multimode optical fiber, for instance 50 µm core/125 µm diameter optical fiber, because most of the core is at an angle of 8° or greater.

Figure 9:
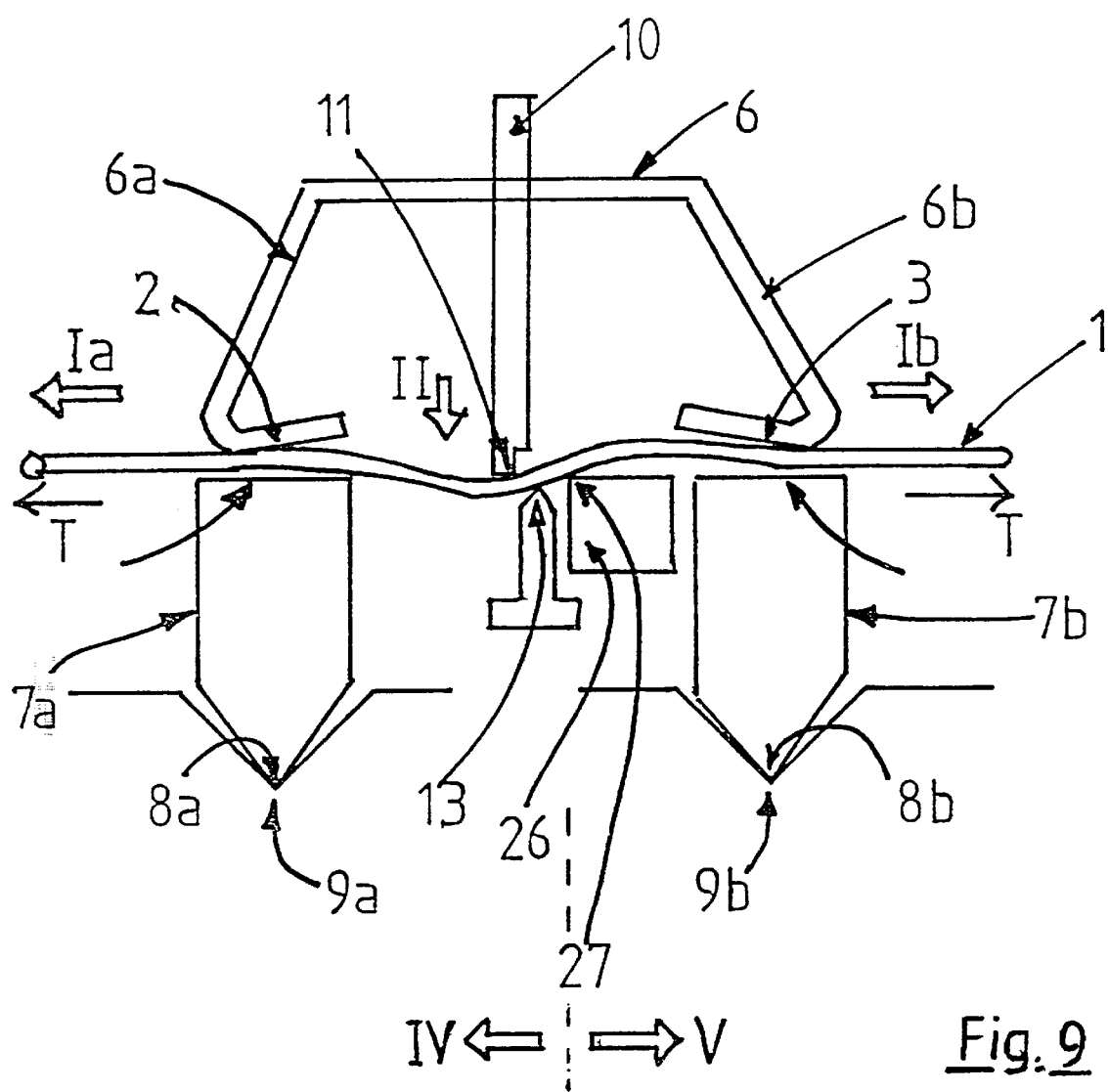

As shown in FIG. 9 the tool can also be constructed so that the lower sharp corner 12 is, in effect, separated from the lower clamping jaw 7b. This can be achieved by the use of a separate block 26 which has a sharp corner 27. As before the fiber 1 is clamped between surfaces 2 and 4 and 3 and 5, tensioned and then contacted by the anvil 10 which shears it between the corner 11 of the anvil and the corner 27 of the block 26. The sheared fiber then angle cleaves when it is scored by the diamond blade edge 13. The end angle achieved depends upon the distances h, $x_1$ and $x_2$. The end angle achieved can be varied by varying the position of the block 26, in the direction IV or V or by its removal so changing the distance $x_2$. Owing to the confined space (e.g. 1.00 mm) between the anvil corner 11 and the corner 12 of the jaw 7b and also the presence of the blade 13, the block 26 may be more in the nature of a thin blade or shim.

FIG. 4b (as already referred to) shows the shape of an angled cleaved end face, as obtained from interferograms of the cleaved angled end. This shows that the core of the single mode fiber is angled at 8° and is approximately flat. This ensures that the back-reflection is reduced to approximately −60 dB. The majority of the semicircle of the fiber end away from the point of the score is also flat and angled at 8°, whereas the end angle of the semi-circle of the end face close to the score point varies between 8° and 0° from the perpendicular. The reduction in angle of the end face close to the point of the score is beneficial in some circumstances. The cleaved end face does not have any sharp corners which might be damaged. Furthermore, the perpendicular portion of the end face is useful for butting against a stop such as might be required mechanically to locate the angle cleaved fiber end in an opto-electronic package. Furthermore, the core of the fiber is dished and so is unlikely to come into contact with any part of such a stop, and therefore the core of the fiber is less likely to be damaged.

The tool is also able to angle cleave polarisation-maintaining (PM) fiber. Three types of 125 µm diameter PM fiber were cleaved, as obtained from 3M Inc. of the USA, Fujikura of Tokyo, Japan is and from Fibercore of Southampton, England. All three types of PM fiber were successfully angled cleaved with end angles which were similar to that obtained for standard single mode fiber. In general, the angled cleaves were smooth and damage free. However, in particular orientations of the angled cleaves, surface cracks were present on the cleaved end face originating from the stress members which were included in the PM fiber to give its polarisation-maintaining characteristics. These cracks were approximately 30 µm away from the single mode core so were unlikely to adversely affect the reduced back-reflection. Prior art tools which use twisting to obtain angled cleaves produces cracks for all orientations of angle cleaved PM fiber.

One practical difficulty of angle cleaving PM fiber is that of orientating the angle of the cleave with respect to the polarisation axis of the fiber. If the PM fiber is glued or otherwise attached to a ferrule or similar and, where the ferrule has an orientation mark such as a flat and the PM fiber is oriented with respect to the flat, then the ferrule can be placed in the cleaving tool in a fixed orientation and the fiber cleaved so that the angle of the cleave is in the correct orientation with respect to the polarisation axis of the PM fiber.

In further practical applications of the tool it can also be used to cleave larger diameter brittle objects such as glass Selfoc lenses and glass rods of doped glass used as solid state lasers, cleaving the objects with mirror smooth ends angled away from the perpendicular. The glass rods comprising the Selfoc lenses or the laser rods are clamped at two points and tensioned and sheared by the motion of an anvil, They are scored with an acutely angled blade and cleave at an angle β from the perpendicular. Objects of larger diameter will generally require greater tensions than used above. Scoring may be effected before or after shearing.

Whereas the sequences of operation of the various forms of the tool herein desired above are preferred, it is to be understood that some or all of the operational steps of clamping, tensioning, deflecting (bending) and scoring of the fiber or fibers can be carried out in any desired order. Also in some cases the deflecting or bending of the fiber by the anvil 10 or like means can be such that the fiber is sufficiently tensioned to cause its angled cleavage as a result of scoring by the blade edge 13. In view of this clamping of the fiber and tensioning thereby is not required and it is only necessary to locate the fiber such as in suitable grooving in the tool support structure or body.

What is claimed is:

1. A tool for cleaving of at least one optical fiber at an angle to the fiber axis, the tool comprising:

a pair of spaced apart clamping means configured to grip a length of optical fiber therebetween and having tensioning means for tensioning said length of fiber;

anvil means;

a blade means for scoring the length of optical fiber in a required sequence of operation of the tool in order to initiate and cause cleaving of the length of optical fiber at an angle to the fiber axis; wherein:

said anvil means has a transverse first sharp corner edge for transverse contact with the fiber;

said corner edge is closely offset laterally from a corresponding transverse second sharp corner edge of a clamp member of one of the clamping means or of a separate part adjacent to said clamp member;

said anvil means is configured to move laterally of said fiber a preset distance to deflect the length of optical fiber a preset amount thereby to apply further tension force and a shear force to said fiber between said first and second sharp corner edges prior to scoring of said fiber by said blade means;

and said blade means is positioned to score said deflected fiber between said first and second sharp corner edges thereby to obtain angled cleaving of the fiber;

and wherein said angle is a function of said preset amount of deflection of said fiber.

2. A tool for angled cleaving of at least one optical fiber according to claim 1 wherein the blade means between said transverse sharp corner edges is positioned laterally closer to said first sharp corner edge of the anvil means than to said second sharp corner edge.

3. A tool for angled cleaving of at least one optical fiber or the like according to claim 2 wherein the clamping means opposite to said transverse second sharp corner edge is adapted to receive a coating or an attachment or connection of the fiber whereby a stripped length of the fiber or a coated length thereof can be positioned for angled cleaving by the tool.

4. A tool for angled cleaving of at least one optical fiber or the like according to claim 3 wherein stop means is provided in the tool for axial end location of the fiber coating when the latter is clamped in the tool whereby angled cleaving of a stripped length of the fiber can be obtained at a preset distance from the located end of the coating.

5. A tool for angled cleaving of at feast one optical fiber according to claim 1 wherein the clamping means opposite to said transverse second sharp corner edge is adapted to receive a coating or an attachment or connection of the fiber whereby a stripped length of the fiber or a coated length thereof can be positioned for angled cleaving by the tool.

6. A tool for angled cleaving of at least one optical fiber or the like according to claim 5 wherein stop means is provided in the tool for axial end location of the fiber coating when the latter is clamped in the tool whereby angled cleaving of a stripped length of the fiber can be obtained at a preset distance from the located end of the coating.

* * * * *